A. C. DAVIS.
RIVET SET HOLDER FOR RIVETING HAMMERS.
APPLICATION FILED DEC. 4, 1915.

1,211,417.

Patented Jan. 9, 1917.

Witnesses

Inventor
Arthur C. Davis
By
Attorney

UNITED STATES PATENT OFFICE.

ARTHUR C. DAVIS, OF CRISTOBAL, CANAL ZONE.

RIVET-SET HOLDER FOR RIVETING-HAMMERS.

1,211,417. Specification of Letters Patent. Patented Jan. 9, 1917.

Application filed December 4, 1915. Serial No. 65,134.

*To all whom it may concern:*

Be it known that I, ARTHUR C. DAVIS, a citizen of the United States of America, residing at Cristobal, Panama, Canal Zone, have invented certain new and useful Improvements in Rivet-Set Holders for Riveting-Hammers, of which the following is a specification.

My invention relates to a rivet set holder for riveting hammers operated by compressed air or steam, and my object is to provide a safe and effective means for holding the rivet set in position in the nose of the hammer barrel while leaving it free for ready attachment to or detachment therefrom and without impeding or in any manner interfering with the action of the hammer.

In the use of riveting hammers frequent and serious accidents result from the insecure and crude manner in which the rivet sets are tied or secured to the hammer to prevent their loss and I have devised a holding means which will avoid such accidents and which will prevent the loss of the rivet sets and hammer plungers which is constantly occurring.

According to my invention, I mount on the hammer barrel and on the rivet set collars or like means which are connected together to permit the rivet set such reasonable longitudinal movement as may be normally incident to its service but which will not permit the rivet set to become disengaged from the end of the hammer. The collar on the rivet set forms preferably a spring clamp which can be readily opened to permit the convenient removal and replacement of rivet sets therein.

A further novel feature of my invention is the provision of a rivet set holding means which is capable of being turned about the hammer so as to shift the holding means to the most convenient position when working in close places.

My invention further comprises the novel details of construction of the spring clamp collar for the rivet set and for the means of attaching the collar to both rivet set and hammer.

As illustrative of the preferred embodiment of my invention, reference is made to the accompanying drawings, wherein:—

Figure 1:
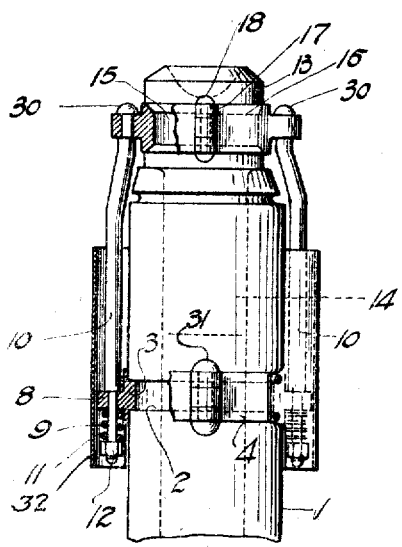
Figure 2:
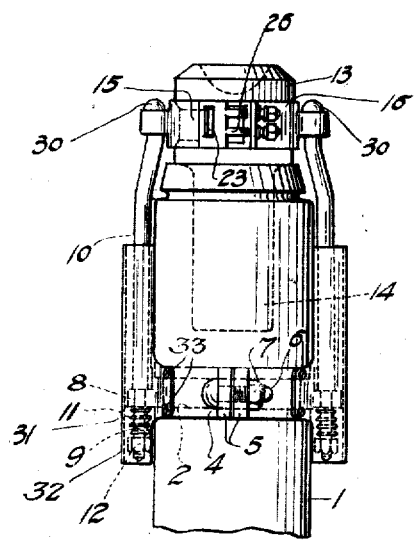
Figure 3:
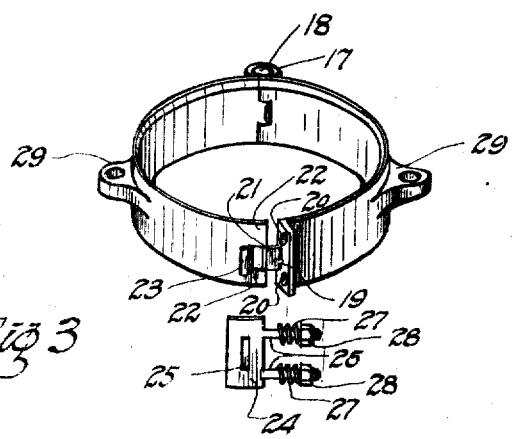

Figures 1 and 2 are front and rear elevations of a hammer equipped with my improved holding means for the rivet set. Fig. 3 is a detail view enlarged on the fastening member for the rivet set clamp, shown in detached position between the parted ends of the clamp.

Similar reference numerals refer to similar parts throughout the drawings.

According to the preferred embodiment of my invention illustrated in the drawings, I provide the barrel 1 of the hammer, at a point adjacent to its nose with an annular groove 2 adapted to receive an annular shoulder 3 raised on the inner face of a split clamp ring 4. This barrel clamp is formed in halves hinged together and having outturned perforated lugs 5 at their open ends adapted to receive a bolt 6, the ends of which are threaded to receive the nut 7. On opposite sides of this clamp 4 I provide a pair of perforated lugs 8 through which the reduced ends 9 of a pair of rods 10 are passed freely and extend sufficiently beyond the lugs to receive, each, a coiled spring 11 and a nut 12 threaded thereon. This yielding connection provides for a limited axial movement of the rods toward the barrel nose in which is mounted a rivet set of any ordinary construction having a shank 14 which fits into the barrel nose and having about its head and annular groove 15, the side walls of which preferably slope inward, whereas the groove 2 in the barrel is rectangular in cross section. A clamp collar 16 is provided to embrace the rivet set, its inner face being shaped to fit snugly into the groove 15. This clamp 16 is formed in two parts which are provided with interleafed perforated lugs 17 at their hinged ends which are pivotally connected by a hinge pin 18 having its ends bradded to afford a permanent connection. One side of the clamp has, at its free end, an out-turned lug 19, provided with a pair of bolt holes 20, and a lug 21 forming an extension beyond the lug 19. The other side of the clamp has a pair of spaced end lugs 22 disposed to receive between them the lug 21 and has also near its free end a lug 23 which is out-turned and slightly bent back and over. A latch member 24, for detachably securing the free ends of the clamp 16 together, comprises a plate having at one end a slot 25 adapted to engage over the lug 23 and having at its other end a pair of threaded shanks 26 adapted to be passed through the holes 20 of the lugs 19 and to receive about them coiled springs 27 disposed between the lug 19 and the nuts 28 which are screwed on the outer ends of the shanks 26. Each section of the clamp 16 is provided with a perforated lug 29 through which the outer reduced ends 30 of the rods 10 are passed and bradded to make a firm connection between the rods and the clamp. Preferably the clamp 4 is formed in two parts which are hinged together by a pin 31 and in applying the collar 4 it should not be caused to grip the barrel tightly but to fit in the groove 2 free to turn about the same.

The engagement of the shoulder 3 in the groove 2 in the barrel is intended to make a connection which will prevent the sleeve from slipping axially of the barrel while leaving it free to turn about the barrel so that the rods 10 can be adjusted to the most convenient position for driving rivets in a close place. A tubular shield or cover 32 for the spring encircled end 9 of each rod 10 extends from the outer ends of the collar 4 to a point below the end 9 of the rod, thus preventing the operator's hand being struck or pinched between the vibrating arms and the clamp lugs 19. These covers are made fast to the collar by tap screws 33. If it be not desired to permit the collar 4 to turn about the barrel it can be made fast to the barrel in any suitable manner, but it is desirable to make the whole connections adjustable about the barrel so that they can be shifted into the most convenient operating position when in close places. By mounting the guards upon the barrel collar, the whole equipment is detachable and can be applied to the present types of barrels without substantial modification thereof and without making them more cumbersome.

In operation, having applied the clamp 16 to the rivet set, the ends of the rods 10 are passed through the lugs 8 of the clamp 4 which has been mounted on the barrel 1 with its annular shoulder 3 interfitted in the groove 2. The springs 11 and nuts 12 are then applied to the ends 9 of the rods 10 and the shields 32 are applied to the collar 4. The riveting hammer is then used in the normal manner, the clamp 16 being free to follow the normal movements of the rivet set responsive to the impact of the plunger and being yet always held against loss. Both clamps are free to be swung about the tool so as to bring the rods where they will not interfere with driving rivets in close places. To insert a new rivet set or to replace one worn, it is only necessary to draw the connecting member 24 against the tension of its springs 27 until it can be disengaged from the lug 28, whereupon the top clamp sleeve can be opened out and the rivet set quickly removed and replaced, after which the fastening member is snapped back to position and the tool is ready for service.

What I claim as new and desire to secure by Letters Patent, is:—

1. In a riveting hammer, a barrel having an annular shoulder near its outer end, a rivet set having an annular groove, a hinged collar mounted for rotation in the groove on the rivet set, yieldable and quick detachable means to connect the free ends of said collar, a hinged collar mounted for rotation on the barrel in engagement with the shoulder thereon, connecting rods for the collars which are made fast in the rivet set collar and are loosely connected to the barrel collar, and springs engaging the loose ends of said connecting rods and acting thereon to draw the collars together, the hinges in said collars being disposed on the same side of the hammer, and said rivet set collar being adapted to be opened to release the rivet set without disturbing the barrel collar or the connection of said rods thereto.

2. In a riveting hammer, a plunger barrel having a circumferential groove turned with straight side walls, a rivet set having a circumferential groove, a split collar yieldingly clamped about the rivet set and interfitting with the groove therein, a collar having a right angled shoulder adapted to fit in the barrel groove, means to clamp the collar in interlocked relation with said groove but free to turn about the barrel, rods having their reduced ends made fast to the rivet set collar at one end, and yieldingly connected to the barrel collar at the other end, and guards for the yieldable connections between the rods and barrel collar.

3. In a riveting hammer, a plunger barrel having a rectangular annular groove turned in its exterior wall near its nose, a rivet set mounted in the barrel and having an annular groove turned therein with outwardly sloping walls, a clamp collar adapted to interfit with said rivet set groove, a yieldable clamp connection for said collar, a barrel collar having a rectangular shoulder which interfits with the barrel groove, means to fasten the collar about the barrel while leaving it free to turn thereabout, lugs on the collars, rods reduced at their outer ends and bradded to the lugs on the rivet set collar, springs surrounding the reduced ends of the rods which project through the lugs on the barrel collar, nuts to adjust the tension on the springs, and tubular guards detachably connected to the barrel collar, and inclosing the adjacent ends of the rods, substantially as described.

4. A riveting hammer, members thereon immovable axially of the barrel and perforated, a rivet set engaging means comprising rods having their inner ends reduced and inserted through the perforations of said members, springs surrounding said reduced ends of the rods beyond said members, nuts on the rods forming end seats for said springs, and guards to surround said members and the spring inclosed ends of the rods connected thereto, substantially as described.

In testimony whereof I affix my signature.

ARTHUR C. DAVIS.

Witness:
NOMIE WELSH.